(12) United States Patent
Panje et al.

(10) Patent No.: US 12,120,120 B2
(45) Date of Patent: Oct. 15, 2024

(54) Wi-Fi MULTIPLE ACCESS POINT—BIOMETRIC BASED IMPROVEMENTS

(71) Applicant: ARRIS Enterprises LLC, Suwanee, GA (US)

(72) Inventors: Krishna Prasad Panje, Karnataka (IN); Emerson Yesupatham, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 300 days.

(21) Appl. No.: 17/405,575

(22) Filed: Aug. 18, 2021

(65) Prior Publication Data

US 2022/0078191 A1 Mar. 10, 2022

Related U.S. Application Data

(60) Provisional application No. 63/075,583, filed on Sep. 8, 2020.

(51) Int. Cl.
| | |
|---|---|
| *H04L 29/06* | (2006.01) |
| *H04L 9/40* | (2022.01) |
| *H04W 4/02* | (2018.01) |
| *H04W 12/088* | (2021.01) |
| *H04W 84/12* | (2009.01) |

(52) U.S. Cl.
CPC .......... *H04L 63/101* (2013.01); *H04W 4/023* (2013.01); *H04W 12/088* (2021.01); *H04W 84/12* (2013.01)

(58) Field of Classification Search
CPC .. H04L 63/101; H04L 63/0861; H04W 4/023; H04W 12/088; H04W 84/12; H04W 12/63
See application file for complete search history.

(56) References Cited

U.S. PATENT DOCUMENTS

| | | | |
|---|---|---|---|
| 10,911,911 B1* | 2/2021 | Wang | H04W 4/029 |
| 2013/0060097 A1* | 3/2013 | Rubin | A61B 5/369 600/301 |
| 2014/0269223 A1* | 9/2014 | Mokhnatkina | G04G 21/025 368/73 |
| 2014/0371547 A1* | 12/2014 | Gartenberg | A61B 5/4812 600/595 |
| 2016/0299483 A1* | 10/2016 | Tong | G06F 1/1684 |
| 2017/0105095 A1* | 4/2017 | Um | H04W 4/70 |

(Continued)

*Primary Examiner* — Phy Anh T Vu
(74) *Attorney, Agent, or Firm* — Wenderoth, Lind & Ponack, L.L.P.

(57) ABSTRACT

A user environment is controlled and altered based on one or more user conditions received from a biometric tracking services associated with a biometric device of a user. A user can set up a user profile that includes one or more user preferences including a biometric parameter, an asset parameter, a biometric service parameter and/or a location parameter. Based on the user preferences a user device and/or an access point device can control the user environment by altering one or more assets of one or more network devices specified by any one or more user preferences. The asset state of an asset can be altered based on one or more user conditions associated with a biometric parameter such that the user environment is automatically altered based on monitoring the one or more user conditions so as to provide the user an enhanced user environment experience.

20 Claims, 6 Drawing Sheets

(56) References Cited

U.S. PATENT DOCUMENTS

2018/0139067 A1\* 5/2018 Josyula ................. H04L 67/535
2020/0408875 A1\* 12/2020 Mai ......................... G01S 7/006
2021/0282075 A1\* 9/2021 Gwak ................... H04W 48/14

\* cited by examiner

Wi-Fi MULTIPLE ACCESS POINT—BIOMETRIC BASED IMPROVEMENTS

BACKGROUND

Companies are increasingly providing Multiple Access Point (MAP) architecture or Home Network Controller (HNC) type of home Wi-Fi management, with multiple access point devices and/or extender access point devices within the home to improve Quality of Experience (QoE) of the user for various client devices by offering extended coverage with seamless roaming in a network environment. Access point devices and extender access point devices communicate with client devices using one or more RF channels.

In a network environment with multiple users and network devices, a user may use a particular network device to connect to one or more Internet-based services or in-network services via an access point device or gateway of the network, for example, a cloud-based storage service, a streaming service, a personal data service, content service, etc. Many users utilize these Internet-based services or internal network services to accent or accommodate their daily routines where the use of these services can be associated with a biometric parameter of the user. For example, users may utilize an Internet service or an in-network service while participating in one or more endeavors, for example, an activity, such as a fitness activity, cooking, cleaning, any other activity within proximity to the network, a routine, such as a morning or a bedtime routine, any other user pursuit within proximity of the network device. One or more biometric parameters of the user can indicate the user's involvement or participation in the activity. However, these services may not discontinue or alter distribution or presentation of the data associated with the service even if the user is no longer within proximity of the network and/or the user has altered their behavior with respect to the endeavor, even if such is indicated by a biometric parameter of the user.

Thus, there is a need for a system that provides control and management of one or more services associated with a user and/or one or more network devices to provide the user with an automatic altering of a service based on one or more biometric parameters associated with the user.

SUMMARY

According to aspects of the present disclosure there are provided novel solutions for deploying a network device within a network, such as an access point device, to control or manage one or more network devices that are used to distribute or present data associated with a service to a user based on one or more user preferences. Today, users can utilize one or more network devices to obtain data from an Internet-based service or an in-network service. For example, a user may utilize a biometric device such as a wearable biometric device that detects or senses one or more biometric parameters associated with the user. A client or user device can be associated with the biometric device such that an application of the client device interfaces with the biometric device to obtain one or more biometric parameters associated with the user. The application of the client device can also interface with one or more other network devices, such as an access point device. The access point device can interface with one or more network devices to provide an environment for the user based on the one or more biometric parameters of the user, one or more user preferences and/or the current user endeavor. In this way, one or more network devices can be controlled and managed based on one or more user conditions associated with a user to provide the user environment per the one or more user preferences for the current user endeavor and/or for the current one or more biometric parameters associated with the user.

An aspect of the present disclosure provides an access point device of a network for receiving a control request from a user device associated with a user to control a user environment of the user. The access point device comprises a memory storing one or more computer-readable instructions and a processor configured to execute the one or more computer-readable instructions to receive a query from a biometric monitoring application of the user device, wherein the query is related to a biometric tracking service associated with a biometric device, and wherein the biometric device is associated with the user, send the query to the biometric tracking service, receive one or more user conditions from the biometric tracking service, wherein the one or more user conditions are associated with the user of the user device, send the one or more user conditions to the biometric monitoring application, receive a request from the biometric monitoring application, wherein the request is based, at least in part, on the one or more user conditions and one or more user preferences associated with the user and control the user environment based, at least in part, on the request, wherein controlling the user environment comprises altering an asset state of at least one of one or more assets at any of one or more network devices coupled to the network, the user device, or a combination thereof based on the control request.

In an aspect of the present disclosure, controlling the user environment comprises blacklisting the at least one of the one or more client devices, the user device or a combination thereof associated with the at least one of the one or more assets.

In an aspect of the present disclosure, each of the one or more assets is associated with an asset type, wherein altering the asset state comprises monitoring the network for data associated with the asset type and preventing transmission of the data associated with the asset type to any of the user device, the one or more network devices, or a combination thereof.

In an aspect of the present disclosure, the request comprises a location parameter, and wherein preventing transmission of the data associated with the asset type to any of the user device, the one or more network devices, or both is based, at least in part, on the location parameter.

In an aspect of the present disclosure, the location parameter comprises any of a specified area, a proximity to the access point device, a proximity to the user device, a type of connection, or any combination thereof, and wherein preventing transmission of the data comprises detecting at least one of the one or more network devices, the user device or a combination thereof based, at least in part, on the location parameter.

In an aspect of the present disclosure, the location parameter comprises a connection type and wherein preventing transmission of the data comprises determining which of the at least one of the one or more client devices, the user device or a combination thereof are connected via Wi-Fi to the network.

In an aspect of the present disclosure, the processor is configured to execute one or more further computer-readable instructions to receive an update request from the biometric monitoring application to alter the asset state, wherein the update request is based, at least in part, on one or more updated user conditions wherein controlling the user environment is based, at least in part, on the one or more updated user conditions.

An aspect of the present disclosure provides a method for an access point device of a network to receive a control request from a user device associated with a user to control a user environment of the user. The method comprising receiving a query from a biometric monitoring application of the user device, wherein the query is related to a biometric tracking service associated with a biometric device, and wherein the biometric device is associated with the user, sending the query to the biometric tracking service, receiving one or more user conditions from the biometric tracking service, wherein the one or more user conditions are associated with the user of the user device, sending the one or more user conditions to the biometric monitoring application, receiving a request from the biometric monitoring application, wherein the request is based, at least in part, on the one or more user conditions and one or more user preferences associated with the user, and controlling the user environment based, at least in part, on the request, wherein controlling the user environment comprises altering an asset state of at least one of one or more assets at any of one or more network devices coupled to the network, the user device, or a combination thereof based on the control request.

In an aspect of the present disclosure, controlling the user environment comprises blacklisting the at least one of the one or more client devices, the user device or a combination thereof associated with the at least one of the one or more assets.

In an aspect of the present disclosure, each of the one or more assets is associated with an asset type, wherein altering the asset state comprises monitoring the network for data associated with the asset type and preventing transmission of the data associated with the asset type to any of the user device, the one or more network devices, or a combination thereof.

In an aspect of the present disclosure, the request comprises a location parameter, and wherein preventing transmission of the data associated with the asset type to any of the user device, the one or more network devices, or both is based, at least in part, on the location parameter.

In an aspect of the present disclosure, the location parameter comprises any of a specified area, a proximity to the access point device, a proximity to the user device, a type of connection, or any combination thereof, and wherein preventing transmission of the data comprises detecting at least one of the one or more network devices, the user device or a combination thereof based, at least in part, on the location parameter.

In an aspect of the present disclosure, the location parameter comprises a connection type and wherein preventing transmission of the data comprises determining which of the at least one of the one or more client devices, the user device or a combination thereof are connected via Wi-Fi to the network.

In an aspect of the present disclosure, the method further comprises receiving an update request from the biometric monitoring application to alter the asset state, wherein the update request is based, at least in part, on one or more updated user conditions and wherein controlling the user environment is based, at least in part, on the one or more updated user conditions.

An aspect of the present disclosure provides a non-transitory computer-readable medium of an access point device for storing one or more computer executable instructions for the access point device to receive a control request from a user device associated with a user to control a user environment of the user. The one or more computer executable instructions when executed by a processor of the access point device, cause the access point device to perform one or more operations including the steps of the methods described above.

An aspect of the present disclosure provides a computer-implemented method for utilizing a biometric monitoring application. The biometric monitoring application stored in a non-transitory memory on a user device coupled to a network, to monitor a biometric parameter associated with a user and control a user environment, the method comprising establishing a connection to an access point device coupled to the network, associating one or more assets with the user, associating a biometric parameter with the user, associating a biometric tracking service with the user, wherein the biometric tracking service is communicatively coupled to a biometric device associated with the user, and wherein an access point device is connected to the biometric tracking service, monitoring, via the access point device, the biometric parameter using a query, to the biometric tracking service, receiving, via the access point device, one or more user conditions from the biometric tracking service based on the query, and controlling the user environment, wherein controlling the user environment comprises altering an asset state of at least one of the one or more assets at a network device connected to the network, the user device, or both based, at least in part, on the one or more user conditions.

In an aspect of the present disclosure, altering the asset state comprises sending, to the access point device coupled to the network, a request to alter the asset state of the user device, the network device, or both.

In an aspect of the present disclosure, each of the one or more assets is associated with an asset type, and wherein altering the asset state of the at least one of the one or more assets at any of the user device, the network device or both comprises sending, to the access point device, a request to prevent transmission of data associated with the asset type to any of the user device, the network device, or both.

In an aspect of the present disclosure, the request comprises one or more instructions to the access point device to prevent transmission of the data associated with a location parameter to any of the user device, the network device, or both.

In an aspect of the present disclosure, the location parameter comprises any of a specified area, a proximity to the access point device, a proximity to the user device, a type of connection, or any combination thereof.

In an aspect of the present disclosure, the computer-implemented method for utilizing a biometric monitoring application, further comprises updating at least one of the one or more user conditions based, at least in part, on the monitoring the biometric parameter and altering the asset state based, at least in part, on the updated one or more user conditions.

In an aspect of the present disclosure, the computer-implemented method for utilizing a biometric monitoring application, further comprises receiving a request to begin monitoring the biometric parameter, activating a first asset of the one or more assets at the user device, the network device, or both based, at least in part, on one or more user preferences associated with the user, updating the one or more conditions and activating a second asset of the one or more assets at any of the user device, the network device based, at least in part, on the one or more user preferences associated with the user and the updated one or more conditions.

An aspect of the present disclosure provides a method for monitoring a biometric parameter of a user. The method comprises establishing a connection to an access point device coupled to the network, associating one or more assets with the user, associating a biometric parameter with the user, associating a biometric tracking service with the user, wherein the biometric tracking service is communicatively coupled to a biometric device associated with the user, and wherein an access point device is connected to the biometric tracking service, monitoring, via the access point device, the biometric parameter using a query, to the biometric tracking service, receiving, via the access point device, one or more user conditions from the biometric tracking service based on the query, and controlling the user environment, wherein controlling the user environment comprises altering an asset state of at least one of the one or more assets at a network device connected to the network, the user device, or both based, at least in part, on the one or more user conditions.

In an aspect of the present disclosure, the altering the asset state comprises sending, to the access point device coupled to the network, a request to alter the asset state of the user device, the network device, or both.

In an aspect of the present disclosure, each of the one or more assets is associated with an asset type, and wherein altering the asset state of the at least one of the one or more assets at any of the user device, the network device or both comprises sending, to the access point device, a request to prevent transmission of data associated with the asset type to any of the user device, the network device, or both.

In an aspect of the present disclosure, the request comprises one or more instructions to the access point device to prevent transmission of the data associated with a location parameter to any of the user device, the network device, or both.

In an aspect of the present disclosure, the location parameter comprises any of a specified area, a proximity to the access point device, a proximity to the user device, a type of connection, or any combination thereof.

In an aspect of the present disclosure, the method for monitoring a biometric parameter of a user further comprises updating at least one of the one or more user conditions based, at least in part, on the monitoring the biometric parameter and alter the asset state based, at least in part, on the updated one or more user conditions.

In an aspect of the present disclosure, the method for monitoring a biometric parameter of a user further comprises receiving a request to begin monitoring the biometric parameter, activating a first asset of the one or more assets at the user device, the network device, or both based, at least in part, on one or more user preferences associated with the user, updating the one or more conditions, and activating a second asset of the one or more assets at any of the user device, the network device based, at least in part, on the one or more user preferences associated with the user and the updated one or more conditions.

An aspect of the present disclosure provides a non-transitory computer-readable medium storing one or more computer executable instructions for monitoring a biometric parameter of a user. The one or more computer executable instructions when executed by a processor of a user device, causes the user device to perform one or more operations including the steps of the methods described above.

The above-described novel solution may be implemented at an access point device of a network, such as a residential gateway and/or a user device according to one or more example embodiments.

Thus, according to various aspects of the present disclosure described herein, it is possible to provide by an access point device a preferred user environment by controlling and managing one or more network devices in a network based on the current user endeavor, one or more biometric parameters associated with the user and/or one or more user preferences. In this way, the user is automatically provided the preferred environment for a particular endeavor without the any user intervention or downtime in the presentation or distribution of one or more services via the one or more network devices.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
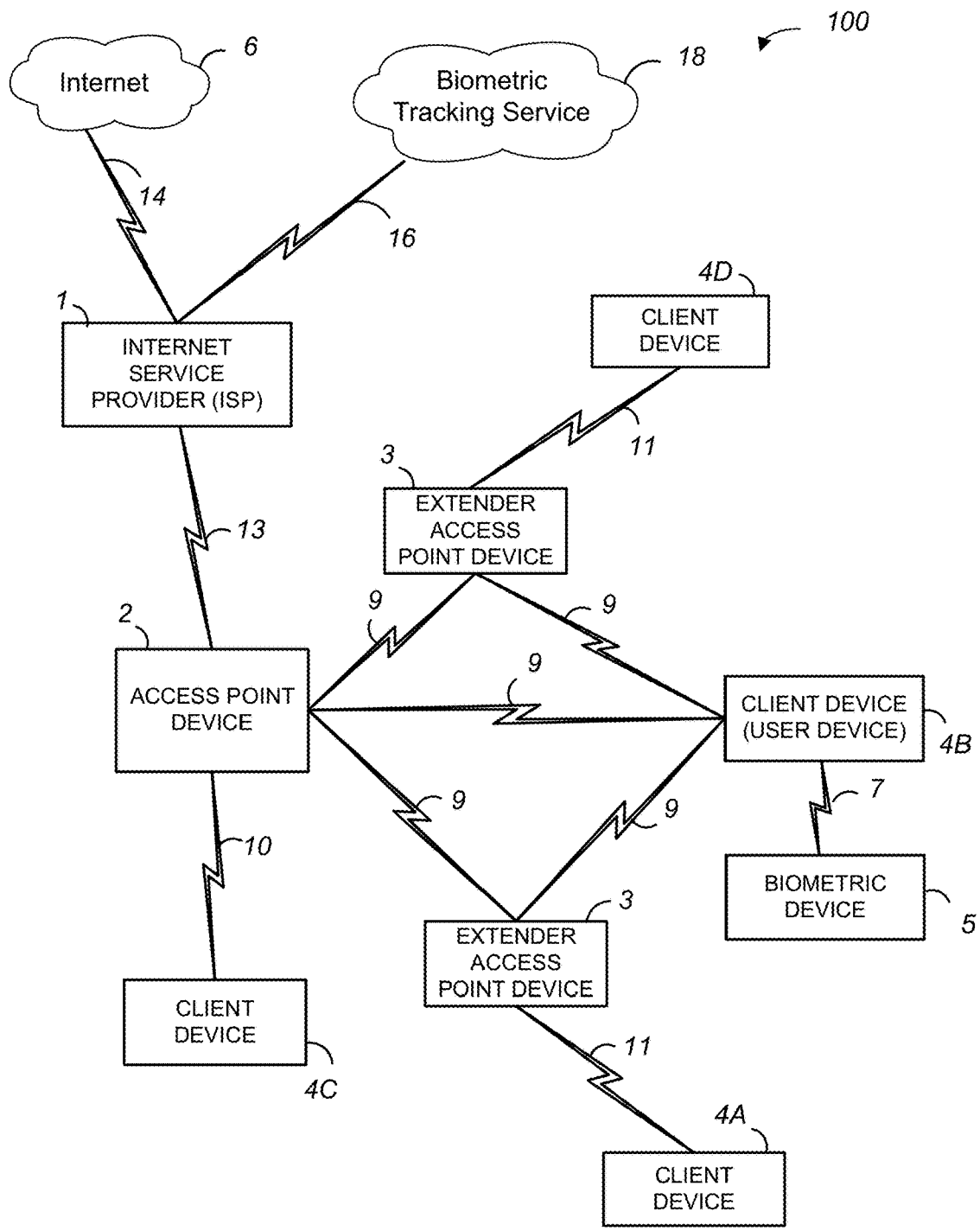
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or more multiple of some of the aforementioned network devices in the system, which may itself consist of multiple communication networks and various known or future developed wireless connectivity technologies, protocols, devices, and the like.

As shown in FIG. 1, the main elements of the network environment 100 include an access point device 2 connected to the Internet 6 via an Internet Service Provider (ISP) 1, a biometric tracking service 18 and also connected to different wireless devices such as one or more extender access point devices 3 and one or more client devices 4A, 4B, 4C and/or 4D (collectively referred to as client device(s) 4). The network environment 100 shown in FIG. 1 includes wireless network devices (e.g., extender access point devices 3 and client devices 4 (such as client devices 4A and 4C and user device 4B) that may be connected in one or more wireless networks (e.g., private, guest, iControl, backhaul network, or Internet of things (IoT) network) within the network environment 100. Additionally, there could be some overlap between wireless network devices (e.g., extender access point devices 3 and client devices 4) in the different networks. That is, one or more network or wireless devices could be located in more than one network. For example, the extender access point devices 3 could be located both in a private network for providing content and information to any of client devices 4 and also included in a backhaul network or an iControl network. In one or more embodiments, any one or more network devices can be wired network devices.

Starting from the top of FIG. 1, the ISP 1 can be, for example, a streaming video provider or any computer for connecting the access point device 2 to the Internet 6, the biometric tracking service 18, or both for access to an asset. The Internet 6 can send or transmit one or more requested assets to the ISP 1, for example, one or more assets associated with any one or more uniform resource locators (URL(s)). The biometric tracking service 18 can include any of a server, a software and/or application, a URL, an application program interface (API), or any combination thereof. An asset can include, but is not limited to, any of an application, a program, a login, a directory, a file structure, a device setting and/or configuration, data, service, content (for example, audio content, video content, or both), any other information received from ISP 1, or a combination thereof. The connection 14 between the Internet 6 and the ISP 1, the connection 16 between the ISP 1 and the biometric tracking service 18, and the connection 13 between the ISP 1 and the access point device 2 can be implemented using a wide area network (WAN), a virtual private network (VPN), a metropolitan area networks (MAN), a system area networks (SAN), a data over cable service interface specification (DOC SIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway, such as a residential gateway, that combines the functions of a modem, an access point (AP), and/or a router for providing content received from the ISP 1 to one or more network devices (e.g., wireless extender access point devices 3 and client devices 4) in the network environment 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can be an electronic device that includes an application or software for controlling one or more network devices, such as one or more client devices 4, to provide a desired or preset user environment as discussed with reference to FIGS. 2-6. For example, the access point device 2 can alter an asset state of one or more assets at a client device to provide a controlled user environment based on a current endeavor or activity of a user associated with a network device, for example, user device 4B.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1. In one or more embodiments, client device 4B (also referred to as user device 4B) can be communicatively coupled to a biometric tracking service 18 via connection 9 to access point device 2 and via connections 13 and 16 from access point device 2 to biometric tracking service 18.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other devices via Wi-Fi and/or Bluetooth, other wireless hand-held consumer electronic devices, such as via connection 7 to a biometric device 5 associated with a user, capable of executing and displaying information received through the access point device 2, or any combination thereof. Additionally, the client devices 4 can be a television (TV), an IP/QAM set-top box (STB) or a streaming media decoder (SMD) that is capable of decoding audio/video content, and playing over OTT or MSO provided content received through the access point device 2. While FIG. 1 illustrates client device 4B as a user device, any one or more client devices 4 can be a user device coupled to a biometric device 5 associated with a user.

Biometric device 5 can connect to user device 4B via a connection 7. Connection 7 can utilize any one or more protocols discussed above with respect to connection 9. Biometric device 5 can be a device wearable by a user, such as a biometric tracking device that detects or senses one or more biometric parameters associated with a user and/or is configurable according to an activity or endeavor of a user. For example, biometric device 5 can be a fitness tracker that detects or senses one or more movements, one or more biometric parameters, or both of a user. The biometric device 5 can send or transmit the one or more biometric parameters to the user device 4B, for example, over a Bluetooth connection, for processing and/or controlling one or more network devices.

The connection 10 between the access point device 2 and the client device 4 can be implemented through a wireless connection that operates in accordance with, but is not limited to, any IEEE 802.11 protocols, for example, a connection that utilizes one or more channels. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection.

Figure 2:
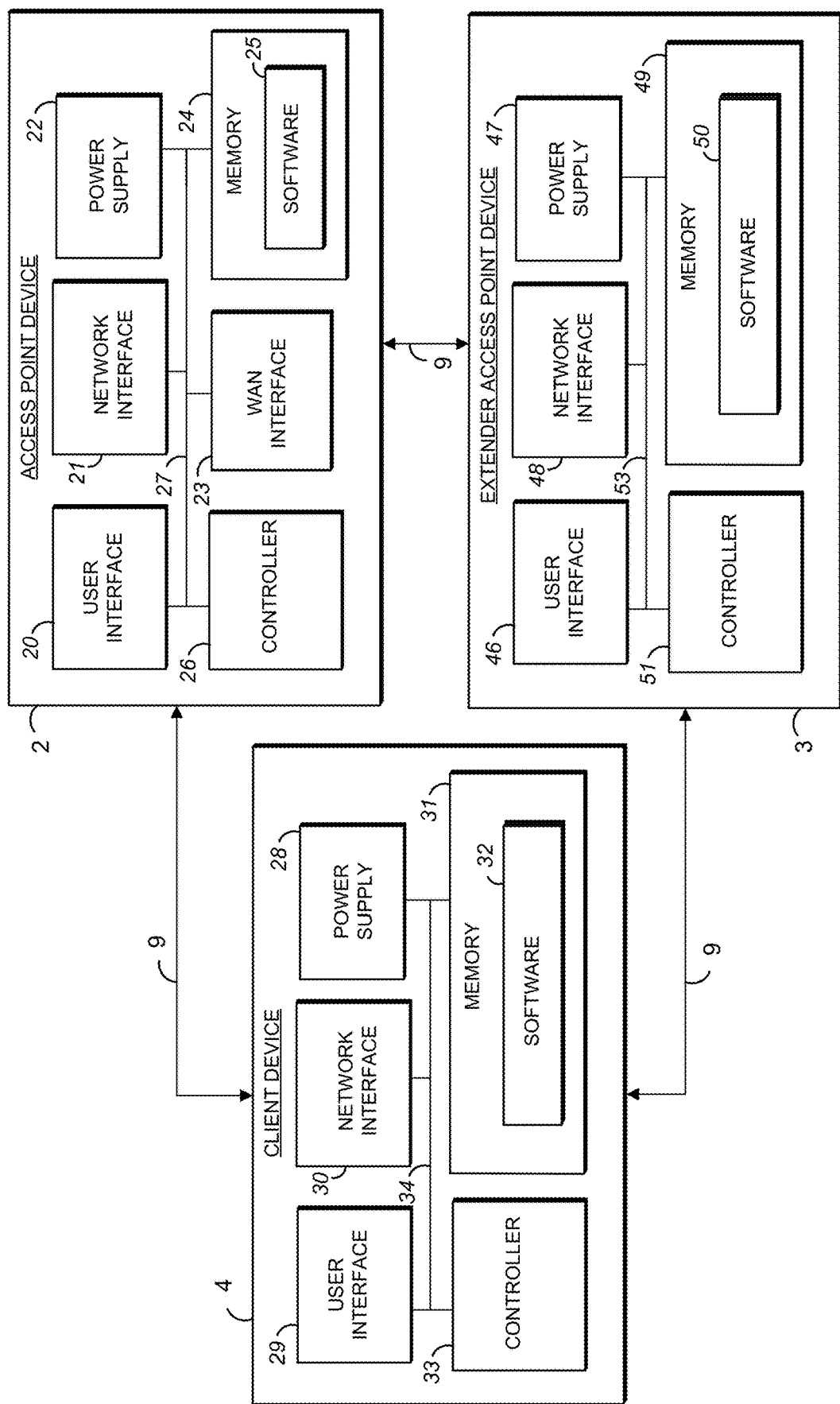
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing and/or network devices over the one or more network connections to local and wide area networks, wireless and wired networks, public and private networks, and any other communication network enabling communication in the network environment 100.

FIG. 2 is a more detailed block diagram illustrating various components of an exemplary access point device 2, client device 4, and wireless extender access point device 3 implemented in the system of FIG. 1, according to one or more embodiments.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1-3.

Now referring to FIG. 2 (e.g., from left to right), the client device 4 can be, for example, any device as discussed with reference to FIG. 1, including, but not limited to, a computer, a portable device, an electronic tablet, an e-reader, a PDA, a mobile phone such as a smart phone, a smart speaker, an IoT device, an iControl device, a portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. For example, client device 4 can be a user device 4B coupled via a connection 7 to a biometric device 5 associated with a user. Additionally, the client device 4 can be a TV, an IP/QAM STB, or an SMD that is capable of communicating with a biometric device 5, such as receiving one or more biometric parameters from the biometric device 5, decoding audio/ video content, and playing over OTT or MSO provided content received through the access point device 2.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, any of one or more push buttons, a camera, a keyboard, a keypad, a liquid crystal display (LCD), a thin film transistor (TFT), a light-emitting diode (LED), a high definition (HD) or other similar display device including a display device having touch screen capabilities so as to allow interaction between one or more users and the client device 4, or a combination thereof. For example, a user can input one or more user preferences for one or more network devices. The one or more user preferences can be associated with one or more assets associated with one or more network devices. For example, a user can set one or more aspects of the user environment using the user interface 29 such as indicating a volume level (asset state) for playback of streaming music (asset) during a particular endeavor or activity of the user based on one or more user conditions that are associated with a biometric parameter of the user.

The network interface 30 can include, but is not limited to, various network cards, interfaces, and circuitry implemented in software and/or hardware to enable communications with the access point device 2 and the extender access point device 3 using the communication protocols in accordance with connection 9 (e.g., as described with reference to FIG. 1). For example, the network interface card 30 allows for communication between the client device 4 and the access point device 2 and/or a biometric tracking service 18 as discussed with reference to FIG. 1. As shown, network interface card 30 allows for direct communication with access point device 2 and indirect communication with access point device 2 via extender access point device 3. In one or more embodiments, network interface 30 allows the client device 4 to interface with a biometric device 5, for example, over a Bluetooth or BLE connection. For example, the client device 4 can be paired with or otherwise connected to a biometric device 5.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is an electronic device shared between multiple users, and software 32 includes one or more applications and/or instructions for interfacing with the access point device 2 and the extender access point device 3 so as to access ISP 1. In one or more embodiments software 32 is a biometric monitoring application that monitors one or more biometric parameters associated with a user as discussed with reference to FIGS. 3-6. In one or more embodiments, software 32 includes the biometric monitoring application and any other application or instructions that allow the client device 4 to connect to the network and/or to be managed by access point device 2. For example, the biometric monitoring application can be included within another application and/or be accessed, controlled, executed, initiated, queried, etc. by another application. Memory 31 can also store any of one or more user preferences, one or more biometric parameters associated with a user, one or more assets and/or one or more asset states associated with a user, one or more user conditions, or any combination thereof.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to one or more client devices 4, which may be out of range of the access point device 2 including, but not limited to, a wireless extender, a repeater, and/or an access point device. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the extender access point device 3.

The power supply 47 supplies power to the internal components of the wireless extender access point device 3 through the internal bus 53. The power supply 47 can be connected to an electrical outlet (e.g., either directly or by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul (BH) connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul (FH) connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the extender access point device 3 may be established using the internal bus 53.

The access point device 2 can be, for example, a hardware electronic device that can combine one or more functions of any of a modem, a gateway (for example, a residential gateway), an access point (AP), a router, or combinations thereof for providing any asset or content received from the asset provider via ISP 1 to network or wireless devices (e.g., extender access point devices 3, client devices 4) in the system, for example, network environment 100 of FIG. 1. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the access point device 2. For example, any one or more user inputs discussed above with respect to client device 4 can entered, set and/or stored at the access point device 2.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul (BH) connection between the access point device 2 and the wireless extender access point device(s) 3. Another radio or set of radios (e.g., 2.4 GHz, 5 GHz, and/or 6 GHz radio(s)) provides a FH connection between the access point device 2 and one or more client devices 4.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 and/or biometric tracking service 18 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and controlling one or more network devices (for example, wireless extender access point devices 3 and client devices 4) in the network in accordance with the embodiments described in the present disclosure (e.g., controlling a user environment including controlling an asset state of one or more assets of one or more network device based on one or more biometric parameters associated with a user, one or more user preferences, one or more user conditions, or combinations thereof). Memory 24 can also store any of one or more user preferences, one or more biometric parameters associated with a user, one or more assets and/or asset states associated with a user, one or more user conditions, or any combination thereof. The software 25 can comprise one or more computer-readable instructions that cause the access point device 2 to control one or more network devices of a user environment.

The controller 26 controls the general operations of the access point device 2 as well as performs management functions related to the other network devices (wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure including, but not limited to, controlling one or more network devices of a user environment. Communication between the components (e.g., 20-26) of the access point device 2 may be established using the internal bus 27. The controller 26 may also be referred to as a processor, generally.

Figure 3:
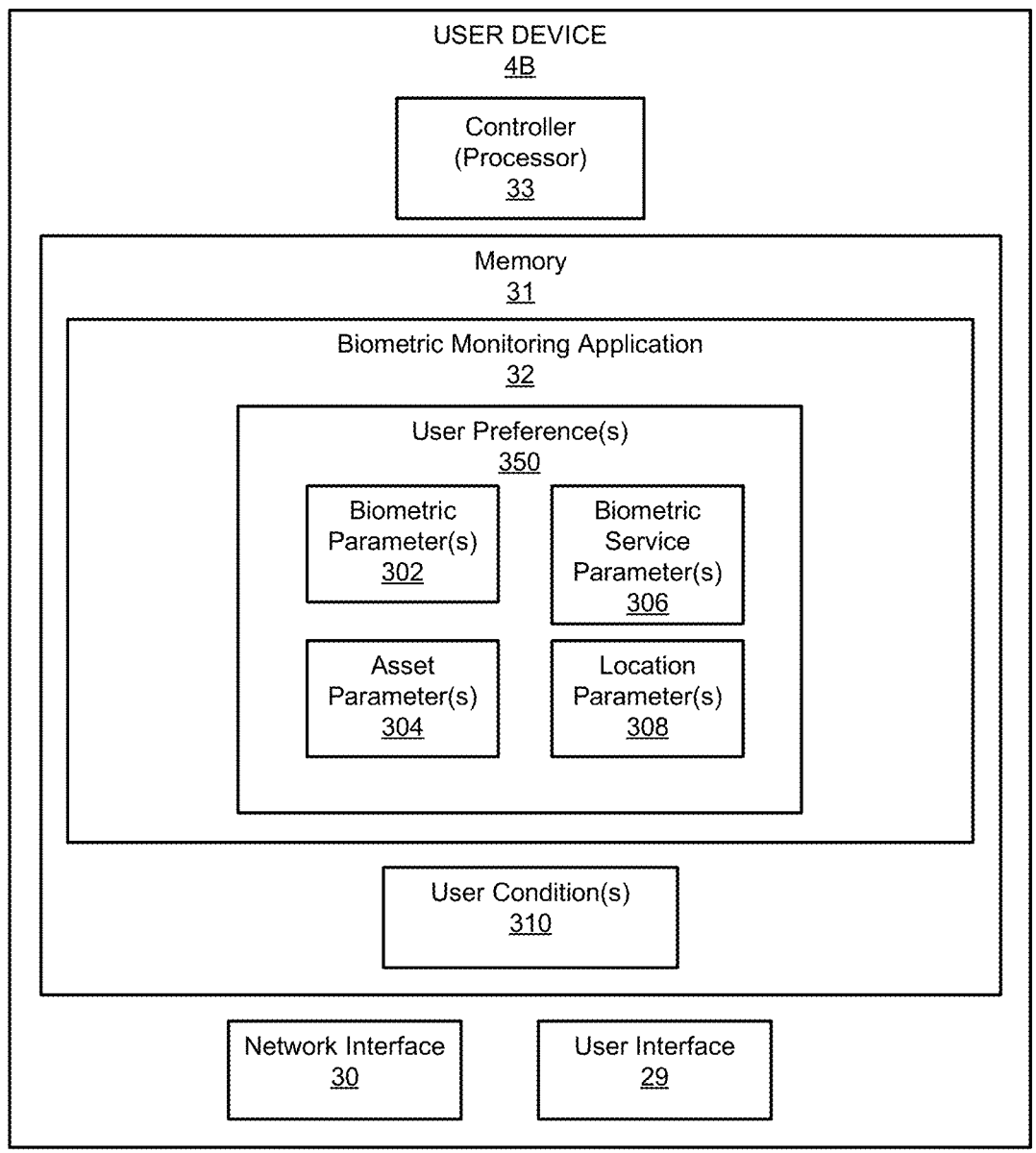
FIG. 3 illustrates a more detailed block diagram of a client device as a user device, according to one or more aspects of the present disclosure.

FIG. 3 illustrates a more detailed block diagram of a client or user device 4B, according to one or more aspects of the present disclosure. While FIG. 3 illustrates a single user device 4B, the present disclosure contemplates any number of client or user devices 4.

FIG. 3 illustrates a user device 4B that includes all the components/elements discussed with client device 4 with reference to FIG. 2. As shown, a user device 4B can include a software application 32 referred to as a biometric monitoring application 32. The Biometric Monitoring Application 32 can access and/or utilize any number of user preferences 350 including, but not limited to, any of one or more biometric parameters 302, one or more asset parameters 304, a biometric service parameter 306 associated with a biometric device of a user, one or more location parameters 308, or any combination thereof which any one or more can be referred to collectively as one or more user preferences 350. Any of the user preferences 350 can be stored in memory 31 and accessed or utilized by biometric monitoring application 32. Any of the user preferences 350 can be received via a user interface 29, a biometric device 5, a biometric tracking service 18, or any combination thereof.

The one or more biometric parameters 302 can include one or more biometrics and one or more associated target and/or threshold values where the one or more biometrics are to be monitored by the biometric monitoring application 32. The one or more biometric parameters 302 can include, but are not limited to, any of a heart rate (for example, including associated targets/thresholds of any of a target heart rate, a resting heart rate, a sleeping heart rate, any other heart rate, or a combination thereof), a temperature (for example, including an associated target temperature), a blood pressure (for example, including an associated any of a target blood pressure, a resting blood pressure, any other blood pressure, a sleeping blood pressure, or a combination thereof), an oxygen level (for example, including an associated target oxygen level), an age, any other sensed, detected or known biometric parameter and/or associated threshold/target, or a combination thereof. In one or more embodiments, the biometric parameters 302 are associated with any of a particular user, a group of users, a default user, or any combination thereof. The memory 31 or any other storage medium local to or remote from the user device 4B can store the associated one or more biometric parameters. For example, a group of users with similar or the same endeavor or activity needs and/or user environment preferences can utilize the same one or more biometric parameters. Such a group could include a fitness class, a running group, any other single or group activity or endeavor. For example, a group profile, single user profile or any other type of profile can be set based on one or more user preferences 350.

The one or more asset parameters 304 can be associated with one or more assets of one or more network devices. The one or more asset parameters 304 can include or identify an asset (such as a music streaming service, video streaming service, any other service and/or asset, or a combination thereof), a state of an asset associated with one or more user conditions, one or more network devices associated with an asset, an associated date and/or time, or any combination thereof. For example, a user can specify that an asset parameter 304 can be associated with a streaming video service that is associated with (such as distributed to or presented at) a first client device 4 and/or a second client device 4, that a volume for playback of the asset be a first level when a user condition 310 indicates a heart rate at a target heart rate and a second level when a user condition 310 indicates a heart rate at a cool down and/or resting heart rate.

The biometric service parameter 306 can identify a service associated with the biometric device 5, for example, a biometric tracking service 18. The biometric service parameter 306 can be a URL or any other identifier of the biometric tracking service 18 that is communicatively coupled to the biometric device 5 so that the biometric tracking service 18 can track or receive one or more user conditions 310 of a user 402 associated with the biometric device 5. The biometric tracking service 18 identified by the biometric service parameter 306 can receive a query from and send data and/or information, for example, one or more user conditions 310, to an access point device 2 that is connected to the user device 4B such that biometric monitoring application 32 of the user device 4B can control the user environment.

A location parameter 308 can identify the one or more network devices associated with a user based on one or more endeavors or activities of the user. The location parameter 308 can identify a group of one or more network devices associated with a specific location (for example, any of an office, a home, a gym, an outdoor facility, a park, etc.) including but not limited to, a type of connection (such as indicating a Wi-Fi connection specifies network devices connected to the network via a Wi-Fi connection) a specified room or area (such as any of a living room, a basement, a bedroom, a weight room, an aerobics room, a proximity to any one or more network devices such as the access point device 2, an extender access point device 3, a client device 4, a user, a user device 4B, any other network device, or a combination thereof). The location parameter 308 can be associated with any of a particular user or group of users, one or more biometric parameters 302, one or more asset parameters 304, one or more user conditions 310, or a combination thereof. The location parameter 308 can be received from a user prior to or at the time of an endeavor or activity. For example, a user can select a bedroom location from the one or more location parameters 308 such that based on any one or more associated asset parameters 304 a streaming device (such as a television connected to a set top box) is turned on at a particular volume level and remains on or in playback mode until, for example, a comparison of a user condition 310 to a biometric parameter 302 indicates that a user is at a sleeping heart rate.

In one or more embodiments, the one or more user conditions 310 are biometrics of a user or a group of users. The one or more user conditions 310 can correspond to one or more biometric parameters 302. The one or more user conditions 310 can be detected or sensed by one or more biometric devices 5. The one or more user conditions 310 can be received from a biometric tracking service 18, a user device 4B, or both. The one or more user conditions 310 can be received in real-time, constantly, intermittently, periodically, in one or more timed intervals, based on a detected change (such as a detected threshold change in one or more of any of the user conditions 310, a change in endeavor or activity, or any combination thereof), as a batch or singularly, or any combination thereof. The memory 31 or any other storage medium local to or remote from the user device 4B can store the one or more user conditions 310 and any of these one or more user conditions 310 can be used to perform a trend analysis, averaged, culled, used in any other analysis, or any combination thereof. For example, any of the one or more user conditions 310 can be compared to corresponding one or more biometric parameters 302 and/or one or more user conditions 310 can be averaged prior to the comparison.

In one or more embodiments, the one or more user conditions 310 are biometrics of a user or a group of users. The one or more user conditions 310 can correspond to one or more biometric parameters 302. The one or more user conditions 310 can be detected or sensed by one or more biometric devices 5. The one or more user conditions 310 can be received from a biometric tracking service 18 as identified by biometric service parameter 306, a user device 4B, or both. The one or more user conditions 310 can be received in real-time, constantly, intermittently, periodically, in one or more timed intervals, based on a detected change (such as a detected threshold change in one or more of any of the user conditions 310, a change in endeavor or activity, or any combination thereof), as a batch or singularly, or any combination thereof. The memory 31 or any other storage medium local to or remote from the user device 4B can store the one or more user conditions 310 and any of these one or more user conditions 310 can be used to perform a trend analysis, averaged, culled, used in any other analysis, or any combination thereof. For example, any of the one or more user conditions 310 can be compared to corresponding one or more biometric parameters 302 and/or one or more user conditions 310 can be averaged prior to the comparison.

Any of the one or more user preferences 350 and/or other values including, but not limited to, any of the biometric parameter(s) 302, asset parameter(s) 304, biometric service parameter 306, location parameter(s) 308, user condition(s) 310, or a combination thereof can be stored as any of a linked-list, a flat file, a data structure, a database, a table, any other format, or a combination thereof and can be combined or used separately to control a user environment according to the one or more user preferences 350 of the user.

Figure 4:
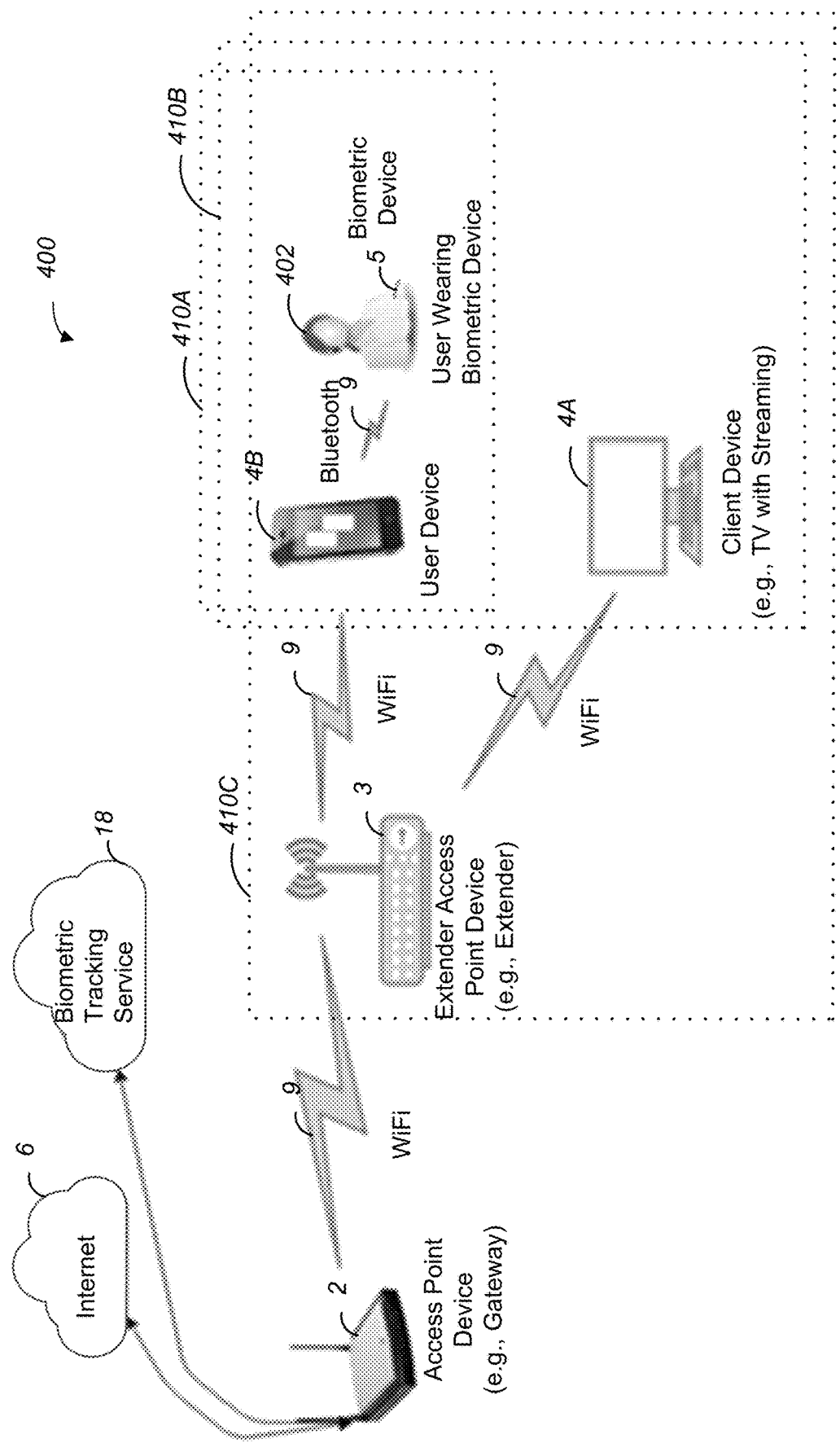
FIG. 4 illustrates a block diagram of an access point device connected to a network for controlling a user environment, according to one or more aspects of the present disclosure.

FIG. 4 is a block diagram of an access point device 2 connected to a network (such as a wireless fidelity network of connections 9) for controlling a user environment 400, according to one or more aspects of the present disclosure.

As discussed with reference to FIG. 1, access point device 2 connects to the Internet 6 and/or a biometric tracking service 18 directly or indirectly, for example, via an ISP 1 as illustrated in FIG. 1. The access point device 2 can access one or more streaming services and/or other content via the Internet 6. Access point device 2 can access a biometric tracking service 18 associated with a user and/or a biometric device 5. The access point device 2, the extender access point device 3, a user device 4B, a client device 4A, and/or a biometric device 5 can be coupled together via any one or more connections associated with a Wi-Fi network for example via any one or more connections 9 as discussed with reference to FIG. 1.

A user 402 can set up a user environment 400 to accommodate one or more endeavors or activities of the user 402. For example, the user 402 can have one or more user preferences 350 associated with one or more endeavors or activities and those one or more user preferences 350 can control the user environment 400. The one or more user preferences 350 can be set by a user 402 via a user interface of a user device 4B or an access point device 2 such that the user 402 can have the user environment 400 automatically altered to accommodate a particular endeavor or activity of the user 402. Such automatic alteration of the user environment 400 provides an improved or enhanced QoE for the user 402.

A user 402 can wear, be in proximity to and/or otherwise be associated with a biometric device 5. The biometric device 5 can be communicatively coupled to a user device 4B, for example, over a Bluetooth connection 9. The biometric device 5 can be associated with the biometric tracking service 18. In one or more embodiments, the biometric tracking service 18 can store one or more biometrics or user conditions associated with the user 402. In one or more embodiments, the biometric device 5 can communicate the one or more user conditions (such as one or more user conditions 310) directly to the biometric tracking service 18, indirectly to the biometric tracking service 18 via user device 4B (such as via a cellular connections) and/or via access point device 2, or any combination thereof.

In one or more embodiments, the user 402 can enter or input one or more user preferences 350 for a particular user environment 400. The user 402 can access or interface with a user interface 29 (for example, a user interface of a biometric monitoring application 32) of client device 4B to set any of the one or more user preferences 350 including, but not limited to, any of one or more biometric parameters 302, one or more asset parameters 304, one or more user conditions 310, one or more location parameters 308, or any combination thereof. These user preferences 350 can be utilized by the biometric monitoring application 32 and/or by access point device 2 to control the user environment 400. While various examples of controlling the user environment 400 are discussed, the present disclosure contemplates use of any combination of user preferences 350 and/or communications discussed herein.

Sleep Scenario: In one or more embodiments, a user 402 can set one or more user preferences 350 associated with a sleep routine of the user 402. The one or more user preferences 350 can be indicative of a user's schedule or routine for going to sleep or resting. The user 402 can set a biometric parameters 302 that are indicative of sleep (for example, a sleep heart rate) and/or an asset parameter 304 for a specific time for one or more days of the week, one or more weekends of the month, one or more holidays, or any other time and/or date combination, one or more assets (for example, a streaming service), one or more asset states (for example, volume control and/or a power control), one or more network devices (for example, a television with streaming capability), or any other asset parameter to accommodate the user environment 402 for a sleep scenario. At the set time, the user device 4B can send a request to the access point device 2 for the asset point device 2 to turn on or activate the television so as to distribute or present the asset at an asset state as per the one or more asset parameters 304. For example, the user 402 can set a time of 10:00 PM for each weekday for a television device to play content from a streaming service at a moderate or low volume level until the user's heart rate is at a sleep heart rate. The user device 4B can send one or more requests to the biometric tracking service for one or more user conditions 310 (for example, a heart rate) detected or sensed by the biometric device 5 of the user 402. The user device 4B can compare the received heart rate with the sleep heart rate. If the heart rate is at, below or both the sleep heart rate, based on the one or more user preferences 350, the user device 4B can send a request to the access point device 2 to discontinue streaming and/or turn off the television. According to one or more user preferences 350, the user device 4B can also request that the access point device 2 alter an asset state of another network device, for example, a soundbar connected to the television. In this way, a user 402 will note be awakened during the night by and/or incur service charges for operation of a network device.

Fitness Scenario: In one or more embodiments, a user 402 can set one or more user preferences 350 associated with a fitness routine of the user 402. For example, the user 402 can set a fitness schedule that is recurring or can select a pre-programmed fitness schedule on demand via the biometric monitoring application of the user device 4B. The user 402 can set one or more user preferences 350 such that a network audio playback device (such as a television 4A, a soundbar, a mobile phone, a tablet, any other network device, or any combination thereof) is activated to playback a set type of music (for example, an up-beat music playlist) from a music streaming source providing via Internet 6 or by a local or other remote storage medium at a set volume level (for example, a high or loud volume level) and monitor a heart rate of the user 402. The user device 4A can query the biometric tracking service (for example, send a request) for the user condition 310 (the heart rate of user 402). The user device 4A can compare the received heart rate to a heart rate threshold set in the one or more biometric parameters (for example, a target heart rate). When the received heart rate is at or exceeds the target heart rate, the user device 4B can send a request to the access device 2 to alter the volume level of the audio playback device and/or any other designated network device. For example, the volume level can be lowered from the high-volume level. In one or more embodiments, the one or more user preferences 350 can also indicate a change from one asset to another. For example, based on the comparison of the received heart rate to the heart rate threshold, the user device 4B can change the type of music from an upbeat music playlist to a relaxing music playlist. In one or more embodiments, the client device 4B can request or query the biometric tracking service based on the biometric parameter (user heart rate) periodically or at intervals such that the user device 4B stores in a memory 31 the one or more user conditions 310 (the user's heart rate). The user device 4B can then determine an average user heart rate and compare the average user heart rate to the target heart rate. Any one or more preferences can be set for any level activity, for example, different target heart rates can be associated with different times and/or heart rate detected throughout a fitness routine. In this way, the user's environment is changed or altered to accommodate the user's level of physical activity based on the one or more preferences and the received one or more user conditions 310.

In one or more embodiments, the user 402 can designated one or more location parameters 308 such that network devices within a location 410A, a location 410B and/or a location 410C can be altered or controlled based on one or more user preferences 350. For example, location 410A includes user device 4B, location 410B includes client device 4A, user device 4B and biometric device 5, and location 410C includes an extender access point device 3, a user device 4B and a client device 4A. Location 410A can be a location that includes all network devices within a proximity of the biometric device 5 and/or user device 4B. Location 410B can be associated with a particular room, such as a bedroom. Location 410C can be a location that includes all network devices within a proximity to a particular network device, for example, an extender access point 3. In one or more embodiments, any one of the locations 410A, 410B and 410C can be controlled based on one or more user preferences 350. While FIG. 4 illustrates locations 410A, 410B and 410C any number of locations can be designated within and/or for user environment 400.

Figure 5:
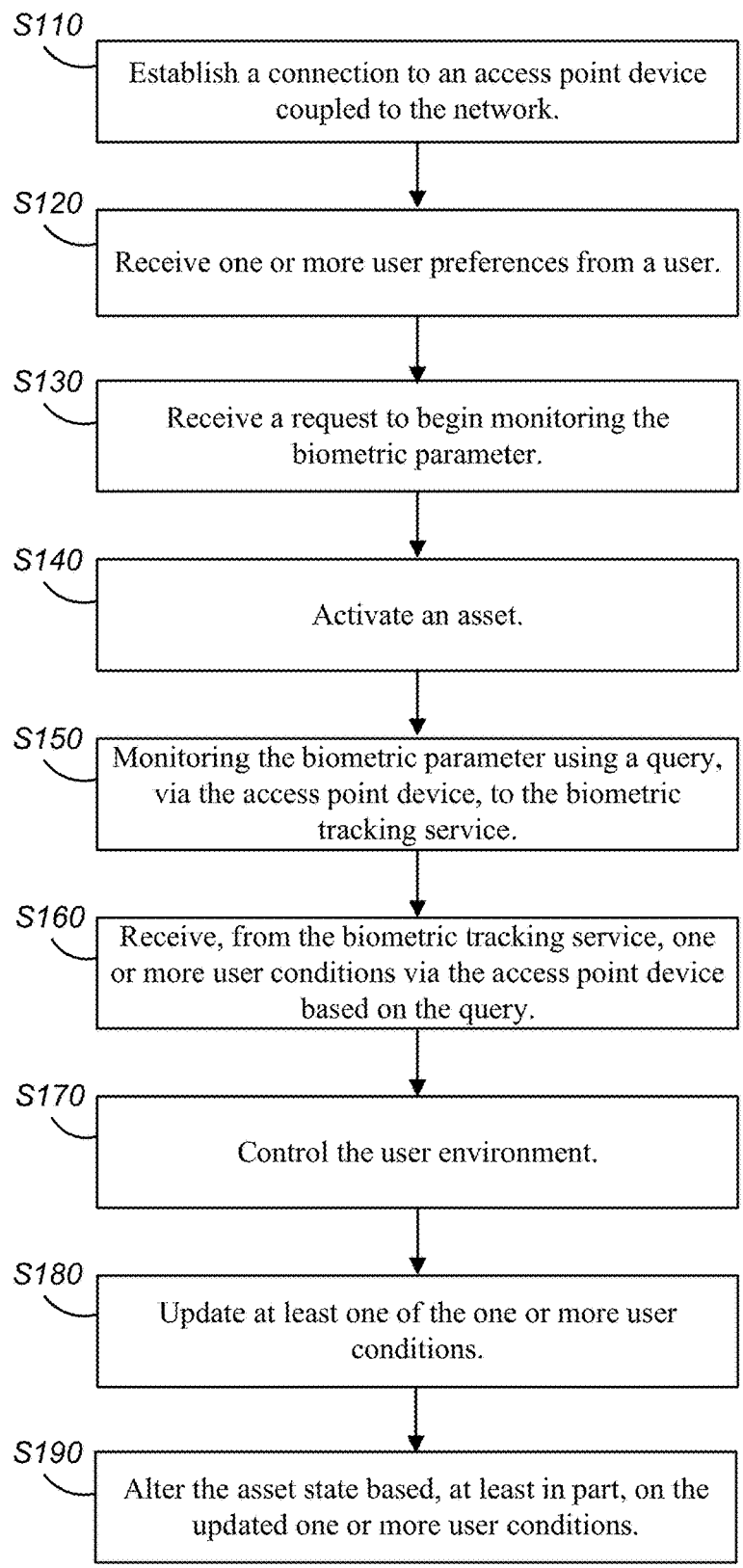
FIG. 5 is a flow chart illustrating a method for controlling one or more network devices of a user environment by an application of a user device, according to one or more aspects of the present disclosure.

FIG. 5 is a flow chart illustrating a method for controlling one or more network devices of a user environment by an application of a user device, for example, a biometric monitoring application such as software 32, according to one or embodiments of the present disclosure.

An access point device 2 and a user device 4B, for example, of a network environment 100, may be programmed with one or more instructions (e.g., software 25 stored in memory 24 and/or software 32 stored in memory 31) to perform one or more operations in one or more example embodiments. In FIG. 5, it is assumed that the devices and/or elements include their respective controllers and their respective software stored in their respective memories, as discussed above in connection with FIGS. 1-4, which when executed by their respective controllers perform the functions and operations in accordance with one or more embodiments of the present disclosure.

The user device 4B comprises a controller 33 that executes one or more computer-readable instructions, stored on a memory 31, that when executed perform or cause the user device 4B to perform one or more of the operations of steps S110-S190. In one or more embodiments, the one or more instructions can be one or more software or applications, for example, one or more software 32, such as a biometric monitoring application. While the steps S110-S190 are presented in a certain order, the present disclosure contemplates that any one or more steps can be performed simultaneously, substantially simultaneously, repeatedly, in any order or not at all (omitted).

To provide an improved QoE for users and to control the user environment within the network environment, one or more novel solutions as discussed with reference to steps S110-S190 are provided to automatically control the user environment based on one or more user preferences 350.

At step S110, the user device 4B establishes a connection to an access point device 2 that is coupled to the network via, for example, connection 9 or any other connection. In one or more embodiments, the user device 4B is discovered by the access point device 2 when the user device 4B is within proximity to the access point device 2. In one or more embodiments, the user device 4B can be prompted to install an application, if not already present, related to one or more management functions of the access point device 2.

To provide control over a user environment, user device 4B can include an application, such as a biometric monitoring application, as software 32. At step S120, the user device 4B, via the biometric monitoring application 32, can receive one or more user preferences 350 from a user 402. For example, the user 402 can set one or more user preferences 350 via the biometric monitoring application 32. The user 402 can via a user interface 29 of the user device 4B set or input one or more user preferences 350 as discussed with reference to FIGS. 3 and 4. The user 402 can establish a user profile, for example, via the user interface 29, such that one or more user preferences 350 are associated with the user 402. For example, the user 402 can associate any of one or more biometric parameters 302, one or more assets 304, a biometric service parameter 306, one or more location parameters 308, or any combination thereof with the user 402. In one or more embodiments, an asset parameter 304 comprises an asset and an asset type. The user 402 can associate each asset with an asset type.

At step S130, the user device 4B can receive a request to begin monitoring one or more biometric parameters 302. For example, the user device 4B can receive a command or instruction to initiate or execute biometric monitoring application 32 by any of detecting that a biometric device 5 is within proximity of the user device 4B, determining initiation based on a date/time, a user input received at a user interface 29 by a user 402 associated with the biometric device 5, any other instruction or command, or any combination thereof.

At step S140, the user device 4B via the biometric monitoring application 32 activates an asset at a network device based, at least in part, on one or more user preference 350 associated with the user. For example, one or more assets can be activated at an asset state as identified by any of the one or more asset parameters 304. One or more assets can be activated based on an associated location parameter 308. In one or more embodiments, a first asset of the one or more assets at a network device is activated based, at least in part, on one or more user preferences associated with the user and then based on one or more user conditions 310 (for example, an updated user condition) a second asset of the one or more assets at a network device is activated based, at least in part, on the one or more user preferences associated with the user and the updated user condition(s). For example, a first asset can include music where the streamed music (first asset type) is sent to a multi-media streaming device (first network device) based on the user preference(s) 350. The user device 4B can send a request to the access point device 2 to activate the asset at the network device. Once one or more conditions 310 are received and/or updated at the user device 4B, the user device 4B can send a request to the access point device 2 for a second asset that includes streaming video (second asset type) of the one or more assets at the multi-media streaming device (first network device) and/or any other network device be activated based, at least in part, on the one or more user preferences 350 associated with the user and the updated and/or received one or more conditions 310. In this way, any asset can be activated at any network device by the user device 4B based, at least in part, on one or more preferences 350 of a user 402, one or more received and/or updated user conditions 310, or a combination thereof.

At step S150, the user device 4B via the biometric monitoring application 32 monitors the biometric parameter 302 associated with the user 402 and/or user device 4B. For example, the user device 4B can monitor, via access point device 2, the biometric parameter 302 using a query to the biometric tracking service 18 associated with the user 402 and/or the user device 4B. The user device 4B can send a query to the access point device 2 where the query includes the biometric parameter 302. The access point device 2 can then request the one or more user conditions 310 associated with the biometric parameter 302 from the biometric tracking service 18.

At step S160, the user device 4B receives, via the access point device 2 connected between the user device 4B and the biometric tracking service 18, one or more user conditions 310 from the biometric tracking service 18 based on the query of step S150. The biometric tracking service 18 can receive one or more user conditions 310 for a user 402 associated with a biometric device 5. These one or more user conditions 310 can indicate any type of user condition tracked by the biometric tracking service 18. One or more of the one or more user conditions 310 can be associated with a biometric parameter 302.

At step S170, the user device 4B controls the user environment 400, for example, based on any one or more user preferences. For example, the user device 4B can alter an asset state of one or more assets at any of a network device connected to the network (including, but not limited to, a client device 4 and/or an extender access point device 3), the user device 4B, or both based, at least in part, on the one or more user conditions 310 received from the biometric tracking service 18. The user device 4B can alter an asset state, for example, by sending to an access point device 2 a request to alter the asset state of the user device 4B, one or more network devices or both. In one or more embodiments, the user device 4B alters the asset state of an asset associated with and asset type for any one or more associated network devices. For example, a user 402 can associate one or more streaming devices as an asset with an asset type such that the user device 4B can send a request to the access point device 2 to alter an asset state all of the one or more streaming devices based on the one or more streaming devices being associated with the same asset type. In one or more embodiments, the user device 4B can send a request to the access point device 2 to prevent transmission of data associated with the asset type and/or a location parameter 308 of one or more associated network devices.

At step S180, the user device 4B updates at least one of the one or more conditions 310. For example, the user device 4B can continuously or periodically monitor any one or more biometric parameters 302 such that the user device 4B can receive updates to the one or more conditions 310 as discussed with steps S150-S160. The user device 4B can then control the user environment 400 based, at least in part, on the updated one or more conditions 310, for example, as discussed with respect to step S170. In one or more embodiments, the user device 4B can perform one or more analysis based on the one or more conditions 310. For example, the user device 4B can any number of a condition 310 to control the user environment 400.

At step S190, the user device 4B can alter the asset state of an asset based, at least in part, on one or more updated user conditions. In one or more embodiments, the user device 4B can revert the asset state to a previous asset state or can further alter the asset state associated with an asset. For example, a user 402 can specify a first asset state for a first asset for a first user condition and specify a second asset state for the first asset and/or one or more other assets for a second or updated user condition. As an example, a user 402 can specify that a streaming device (a network device) for playback of music (an asset) that is streamed from a network source (an asset type) at a first volume level (asset state) at the beginning of an endeavor or activity until a target heart rate has been reached (e.g., based on a comparison of a biometric parameter 302 to a user condition 310) and then specify that the music streaming device playback a second music playlist at a second volume level. In this way, the user environment 400 is controlled automatically based on one or more user preferences.

Figure 6:
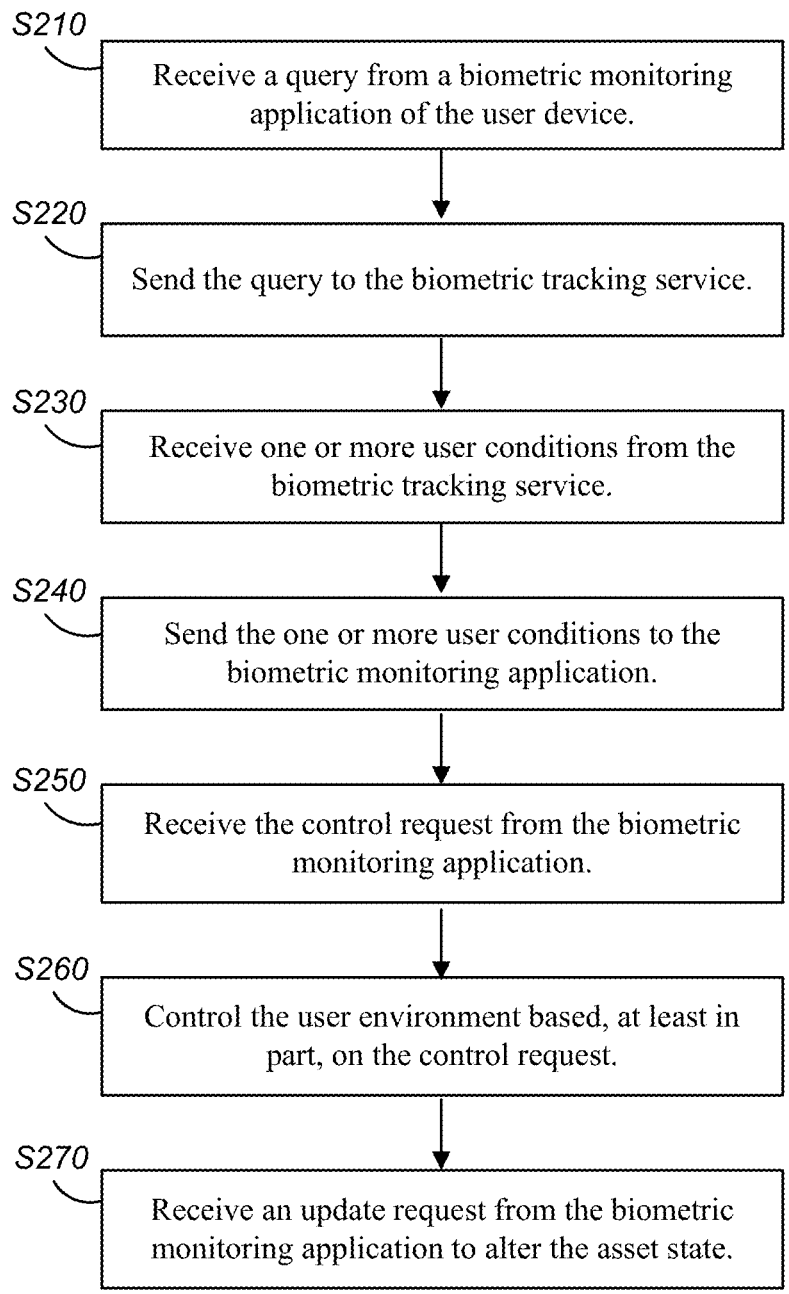
FIG. 6 is a flow chart illustrating a method for controlling by an access point device one or more network devices in a user environment, according to one or more aspects of the present disclosure.

FIG. 6 is a flowchart that illustrates a method for controlling by an access point device 2 one or more network devices in a user environment such as user environment 400, for example, a software 25 that interfaces with a biometric monitoring application 32 of a user device 4B, according to one or embodiments of the present disclosure.

An access point device 2 and a user device 4B, for example, of a network environment 100 or user environment 400, may be programmed with one or more instructions (e.g., software 25 stored in memory 24 and/or software 32 stored in memory 31) to perform one or more operations in one or more example embodiments. In FIG. 6, it is assumed that the devices and/or elements include their respective controllers and their respective software stored in their respective memories, as discussed above in connection with FIGS. 1-4, which when executed by their respective controllers perform the functions and operations in accordance with one or more embodiments of the present disclosure.

The access point device 2 comprises a controller 26 that executes one or more computer-readable instructions, stored on a memory 24, that when executed perform or cause the access point device 2 to perform one or more of the operations of steps S210-S270. In one or more embodiments, the one or more instructions can be one or more software or applications, for example, one or more software 25. While the steps S210-S270 are presented in a certain order, the present disclosure contemplates that any one or more steps can be performed simultaneously, substantially simultaneously, repeatedly, in any order or not at all (omitted).

At step S210, an access point device 2 receives a query, for example, via a connection 9, from a biometric monitoring application 32 of a user device 4B. The query is related to a biometric tracking service 18 associated with a biometric device 5. The biometric device 5 is associated with a user 402 that is associated with a user environment 400. The user device 4B can include an application that allows the user device 4B to be discovered, controlled and/or managed by the access point device 2.

At step S120, the access point device 2 sends the query to the biometric tracking service 18, for example, via a connection 16. For example, the access point device 2 can utilize any one or more APIs associated with the biometric tracking service 18 to format and send the query.

At step S130, the access point device 2 receives one or more user conditions 310 from the biometric tracking service 18. The one or more user conditions 310 are associated with biometrics of the user 402 as detected or sensed by the user device 4B. The user device 4B is pre-registered or associated with the biometric tracking service 18 by the user 402, for example.

At step S140, the access point device 2, sends the one or more user conditions 310 to the biometric monitoring application 32 of the user device 4B.

At step S150, the access point device 2 receives a request from the biometric monitoring application 32. The request is based, at least in part, on the one or more user conditions 310 received from the biometric tracking service 18 and one or more user preferences 350 associated with the user 402 and/or the user device 4B. The request can be in any format and can include any information necessary to identify one or more network devices and/or one or more user preferences 350, for example, one or more assets.

At step S160, the access point device 2 controls the user environment 400 based, at least in part, on the request. The controlling the user environment can comprise altering an asset state of at least one of one or more assets of one or more network devices, for example, an extender access point device 3, a user device 4B and/or a client device 4, where the asset state and/or the assets are asset parameters 304 associated with the user 402 and/or the user device 4B. In one or more embodiments, the access point device 2 monitors the network for data associated with an asset type associated with one or more assets and prevents transmission of the data associated with the asset type to any network device associated with the asset type. In one or more embodiments, the request comprises a location parameter 308 (as discussed with reference to FIG. 3) and the preventing transmission is based, at least in part, on the location parameter. In one or more embodiments, the access point device 2 detects or determines which network devices satisfy the location parameter. For example, the access point device 2 can detect at least one of the one or more network devices connected to the network based on the location parameter and/or determine which of the at least one of the one or more network devices are connected via Wi-Fi to the network. In one or more embodiments, the access point device 2 can blacklist a network device associated with an asset state and/or that satisfies a location parameter or blacklist an asset such that the network device or asset is added to a list is denied access to an asset, for example, content from a specified URL.

At step S170, the access point device 2 receives an update request from the biometric monitoring application 32 to alter the asset state. For example, steps S210-S260 can be executed periodically, continuously, upon receiving an instruction or command, for example from a user 402, and/or at any other interval. The update request can be based, at least in part, on one or more updated user conditions 310 received from the biometric tracking service 18. The controlling the user environment 400 can then be based, at least in part, on the one or more updated user conditions.

According to some example embodiments of inventive concepts disclosed herein, there are provided novel solutions for controlling a user environment based, for example, on one or more user preferences and one or more user conditions. In addition, there is provided a novel interface between a user and a biometric monitoring application that interfaces with a biometric tracking application that is associated with the user's biometric device. The novel solutions according to example embodiments of inventive concepts disclosed herein provide features that enhance the network environment of, for example, a home/residential network gateway (GW), wireless access points (Wi-Fi APs), Home Network Controller (HNC), wireless routers, mesh networking nodes (e.g., Wi-Fi EasyMesh systems), and the like, by providing an automatic control of a user's environment based on biometrics associated with a user.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. An access point device of a network for controlling a user environment of a user, the access point device comprising:
   a memory storing one or more computer-readable instructions;
   a processor configured to execute the one or more computer-readable instructions to:
      receive, via a wireless fidelity (WiFi) connection, a query from a biometric monitoring application of a user device, wherein the query is related to a biometric tracking service associated with a biometric device, and wherein the biometric device is being worn by the user;
      send, via a broadband connection, the query to the biometric tracking service;
      in response to sending the query to the biometric tracking service, receive, via the broadband connection, one or more current user conditions from the biometric tracking service, wherein the one or more current user conditions are obtained from the biometric device, and the one or more current user conditions are associated with the user of the user device;
      send, via the Wi-Fi connection, the one or more current user conditions to the biometric monitoring application of the user device;
      receive, via the Wi-Fi connection, a request from the biometric monitoring application of the user device of the network, to control the user environment of the user, wherein the request is based, at least in part, on the one or more current user conditions, a location parameter, and one or more user preferences of the user, wherein the one or more user preferences associated with one or more assets of one or more network devices; and
      in response to receiving the request, control, via the Wi-Fi connection, the user environment based, at least in part, on the request, wherein controlling the user environment comprises:
      altering an asset state of at least one of the one or more assets at any of the one or more network devices coupled to the network, the user device, or a combination thereof.

2. The access point device of claim 1, wherein the controlling the user environment comprises:
   adding to a blacklist at least one of the one or more network devices, the user device or a combination thereof associated with the at least one of the one or more assets so as to deny access to one or more of the one or more assets.

3. The access point device of claim 1, wherein each of the one or more assets is associated with one or more asset types, wherein the altering the asset state comprises:
   monitoring the network for data associated with the one or more asset types; and
   preventing transmission of the data associated with the one or more asset types to any of the user device, the one or more network devices, or a combination thereof.

4. The access point device of claim 3, wherein the request comprises the location parameter, and wherein the preventing transmission of the data associated with the one or more asset types to any of the user device, the one or more network devices, or both is based, at least in part, on the location parameter.

5. The access point device of claim 4, wherein the location parameter comprises any of a specified area, a proximity to the access point device, a proximity to the user device, a type of connection, or any combination thereof, and wherein the preventing transmission of the data comprises:
   detecting at least one of the one or more network devices, the user device or a combination thereof based, at least in part, on the location parameter.

6. The access point device of claim 4, wherein the location parameter comprises a connection type and wherein the preventing transmission of the data comprises:

determining which of the one or more network devices, the user device or a combination thereof are connected via Wi-Fi to the network.

7. The access point device of claim 1, wherein the processor is configured to execute one or more further computer-readable instructions to:
receive an update request from the biometric monitoring application to alter the asset state, wherein the update request is based, at least in part, on one or more updated user conditions; and
wherein the controlling the user environment is based, at least in part, on the one or more updated user conditions.

8. A method for an access point device of a network to control a user environment of a user, the method being performed by the access point device comprising:
receiving, via a wireless fidelity (WiFi) connection, a query from a biometric monitoring application of a user device, wherein the query is related to a biometric tracking service associated with a biometric device, and wherein the biometric device is being worn by the user;
sending, via a broadband connection, the query to the biometric tracking service;
in response to the sending the query to the biometric tracking service, receiving, via the broadband connection, one or more current user conditions from the biometric tracking service, wherein the one or more current user conditions are obtained from the biometric device, and wherein the one or more current user conditions are associated with the user of the user device;
sending, via the WiFi connection, the one or more current user conditions to the biometric monitoring application of the user device;
receiving, via the WiFi connection, a request from the biometric monitoring application of the user device of the network, to control the user environment of the user, wherein the request is based, on the one or more current user conditions, a location parameter, and one or more user preferences of the user, wherein the one or more user preferences associated with one or more assets of one or more network devices; and
in response to the receiving the request, controlling, via the WiFi connection, the user environment based, at least in part, on the request, wherein controlling the user environment comprises:
altering an asset state of at least one of the one or more assets at any of the one or more network devices coupled to the network, the user device, or a combination thereof.

9. The method of claim 8, wherein the controlling the user environment comprises:
adding to a blacklist at least one of the one or more network devices, the user device or a combination thereof associated with the at least one of the one or more assets so as to deny access to one or more of the one or more assets.

10. The method of claim 8, wherein each of the one or more assets is associated with one or more asset types, wherein the altering the asset state comprises:
monitoring the network for data associated with the one or more asset types; and
preventing transmission of the data associated with the one or more asset types to any of the user device, the one or more network devices, or a combination thereof.

11. The method of claim 10, wherein the request comprises the location parameter, and wherein the preventing transmission of the data associated with the one or more asset types to any of the user device, the one or more network devices, or both is based, at least in part, on the location parameter.

12. The method of claim 11, wherein the location parameter comprises any of a specified area, a proximity to the access point device, a proximity to the user device, a type of connection, or any combination thereof, and wherein the preventing transmission of the data comprises:
detecting at least one of the one or more network devices, the user device or a combination thereof based, at least in part, on the location parameter.

13. The method of claim 11, wherein the location parameter comprises a connection type and wherein the preventing transmission of the data comprises:
determining which of the one or more network devices, the user device or a combination thereof are connected via Wi-Fi to the network.

14. The method of claim 8, further comprising:
receiving an update request from the biometric monitoring application to alter the asset state, wherein the update request is based, at least in part, on one or more updated user conditions; and
wherein the controlling the user environment is based, at least in part, on the one or more updated user conditions.

15. A non-transitory computer-readable medium of an access point device, the non-transitory computer-readable medium storing one or more computer executable instructions to control a user environment of a user, which when executed by a processor of the access point device, cause the access point device to perform operations comprising:
receiving, via a wireless fidelity (WiFi) connection, a query from a biometric monitoring application of a user device, wherein the query is related to a biometric tracking service associated with a biometric device, and wherein the biometric device is being worn by the user;
sending, via a broadband connection, the query to the biometric tracking service;
in response to the sending the query to the biometric tracking service, receiving, via the broadband connection, one or more current user conditions from the biometric tracking service, wherein the one or more current user conditions are obtained from the biometric device, and wherein the one or more current user conditions are associated with the user of the user device;
sending, via the WiFi connection, the one or more current user conditions to the biometric monitoring application of the user device;
receiving, via the WiFi connection, a request from the biometric monitoring application of the user device of the network, to control the user environment of the user, wherein the request is based on the one or more current user conditions, a location parameter, and one or more user preferences, of the user, wherein the one or more user preferences associated with one or more assets of one or more network devices; and
in response to the receiving the request, controlling, via the WiFi connection, the user environment based, at least in part, on the request, wherein controlling the user environment comprises:
altering an asset state of at least one of the one or more assets at any of the one or more network devices coupled to the network, the user device, or a combination thereof.

16. The non-transitory computer-readable medium of claim 15, wherein the controlling the user environment comprises:
adding to a blacklist at least one of the one or more network devices, the user device or a combination thereof associated with the at least one of the one or more assets so as to deny access to one or more of the one or more assets.

17. The method non-transitory computer-readable medium of claim 15, wherein each of the one or more assets is associated with one or more asset types, wherein the altering the asset state comprises:
monitoring the network for data associated with the one or more asset types; and
preventing transmission of the data associated with the one or more asset types to any of the user device, the one or more network devices, or a combination thereof.

18. The non-transitory computer-readable medium of claim 17, wherein the request comprises the location parameter, and wherein the preventing transmission of the data associated with the one or more asset types to any of the user device, the one or more network devices, or both is based, at least in part, on the location parameter.

19. The non-transitory computer-readable medium of claim 18, wherein the location parameter comprises any of a connection type, a specified area, a proximity to the access point device, a proximity to the user device, a type of connection, or any combination thereof, and wherein at least one:
detecting at least one of the one or more network devices, the user device or a combination thereof based, at least in part, on the location parameter; and
determining which of the one or more network devices, the user device or a combination thereof are connected via Wi-Fi to the network.

20. The non-transitory computer-readable medium of claim 15, wherein the one or more computer executable instructions, which when executed by the processor, further cause the access point device to perform one or more further operations comprising:
receiving an update request from the biometric monitoring application to alter the asset state, wherein the update request is based, at least in part, on one or more updated user conditions; and
wherein the controlling the user environment is based, at least in part, on the one or more updated user conditions.

* * * * *